United States Patent [19]

Johnson

[11] 4,448,362
[45] May 15, 1984

[54] METHOD OF AND APPARATUS FOR THE TAPE LOADING AND USE OF A SINGLE TURNTABLE IN THE RENDITION OF A TAPED PROGRAM

[76] Inventor: J. Ralph Johnson, 573 Willham Loop, La Place, La. 70068

[21] Appl. No.: 425,641

[22] Filed: Sep. 28, 1982

Related U.S. Application Data

[63] Continuation of Ser. No. 249,382, Mar. 31, 1981, which is a continuation of Ser. No. 83,771, Oct. 11, 1979, abandoned, which is a continuation of Ser. No. 844,471, Oct. 21, 1977, abandoned, which is a continuation of Ser. No. 736,277, Oct. 27, 1976, Pat. No. 4,066,221.

[51] Int. Cl.³ .............................................. B65H 17/48
[52] U.S. Cl. .............................. 242/55.19 R; 352/128
[58] Field of Search ................. 242/55.19 R, 55.19 A, 242/55.18; 352/128, 78, 72; 360/93, 95

[56] References Cited

U.S. PATENT DOCUMENTS

| | | | |
|---|---|---|---|
| 2,255,724 | 9/1941 | Sunell | 242/55.18 |
| 3,481,551 | 12/1969 | Steelman | 242/55.19 A |
| 3,863,853 | 2/1975 | Umeda | 242/55.19 A |
| 4,066,221 | 1/1978 | Johnson | 242/55.19 A |
| 4,186,891 | 2/1980 | Johnson | 242/55.19 R |

FOREIGN PATENT DOCUMENTS 536692 2/1922 France .

Primary Examiner—Billy S. Taylor
Attorney, Agent, or Firm—Christie, Parker & Hale

[57] ABSTRACT

A turntable is rotated to wind the tape of a taped program thereon in equal lengths per revolution thereof. Each equal winding forces the preceeding windings inwardly on the turntable to assume progressively curving paths as the respective windings recede from the periphery of the turntable. Pressure pads are equally spaced around the periphery of the turntable and rotate therewith. The pressure pads extend radially, and frictionally engage the top edges of the tape windings which follow increasingly curved paths therebetween as the equal windings are forced inwardly by succeeding equal windings. The ends of the tape are connected leaving a portion of the closed loop formed thereby for engagement by associated apparatus and rendition thereby of the taped program. Since all of the windings on the turntable are of the same length per rotation thereof, tape can be simultaneously wound on and off the turntable as it is rotated with no slippage and friction between windings, and as the beginning and end of the taped program are joined, the program can be repeated for as many performances as desired, with only monitoring for mechanical failures required.

7 Claims, 5 Drawing Figures

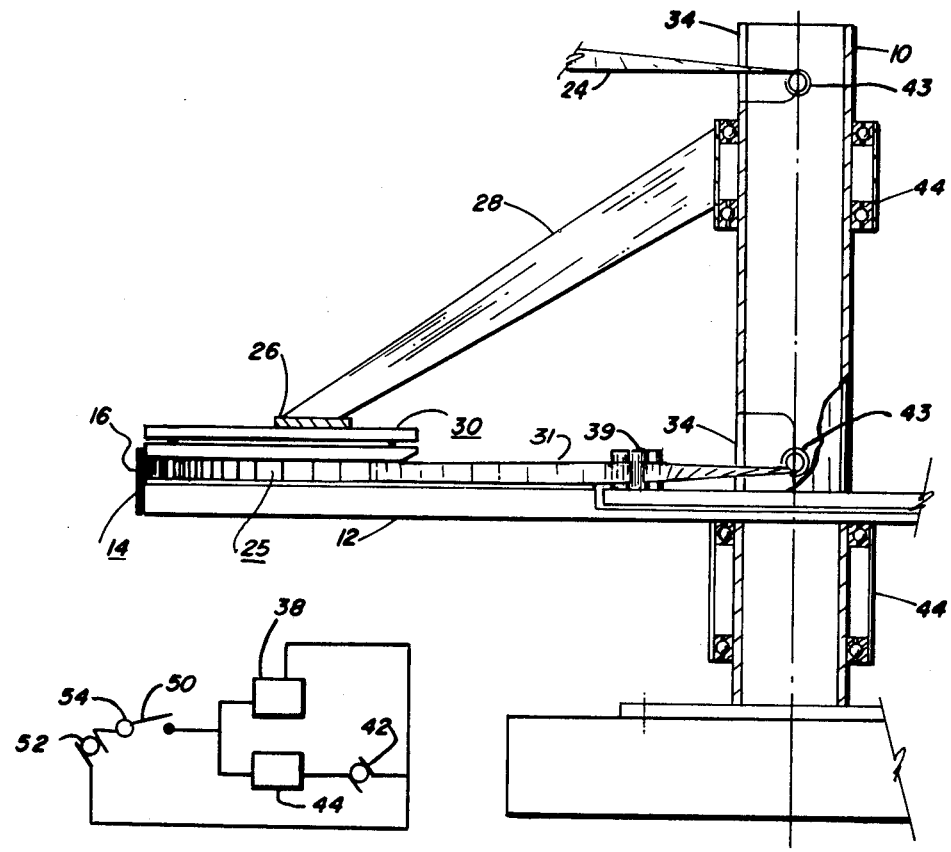
FIG. 5
FIG. 3
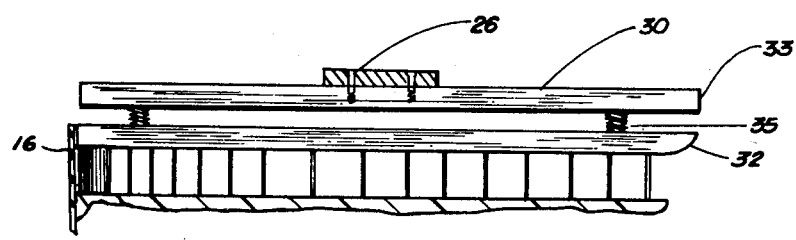
FIG. 4

METHOD OF AND APPARATUS FOR THE TAPE LOADING AND USE OF A SINGLE TURNTABLE IN THE RENDITION OF A TAPED PROGRAM

CROSS REFERENCE TO RELATED APPLICATIONS

This is a continuation of application Ser. No. 249,382, filed Mar. 31, 1981, which now stands allowed, which was a continuation of application Ser. No. 083,771, filed Oct. 11, 1979, now abandoned, which was a continuation of application Ser. No. 844,471, filed Oct. 21, 1977, now abandoned, which was a continuation of application Ser. No. 736,277, filed Oct. 27, 1976, now U.S. Pat. No. 4,066,221.

BACKGROUND OF THE INVENTION

The invention relates generally to a method of and apparatus for the loading and use of turntables in the rendition of taped programs, and more particularly in the loading and use of a single turntable on which the tape of a taped program is wound on and off simultaneously in equal amounts per revolution of the turntable.

Heretofore, the tape of a taped program of the length of a movie, television show, or musical show, has been loaded on a turntable by winding it from the center outward, thereby varying the length of tape per revolution of the turntable directly with the radius of the winding. The outer end of the tape is led through an associated apparatus for the rendition of the taped program, and out to be rewound from center on a second turntable. When the program ends, it can be replayed from the second turntable back onto the first turntable. The two turntables are required because they must turn at varying speeds to deliver and take up tape at a constant linear rate from turntable windings of varying radii.

Also, in the prior art, winding tape from the center of a reel through a cooperating apparatus for the rendition of the taped program and peripherally re-winding it back on the same reel has necessarily been confined to very short lengths of tape loosely wound to allow for slippage and friction between windings due to the reel turning several times to reel off from the center the same lengths of tape that is peripherally reeled on in less than one revolution.

SUMMARY OF THE INVENTION

An object of the invention is to provide a method of and apparatus for loading and unloading the tape of a taped program on a turntable in equal amounts per revolution of the turntable.

Another object of the invention is to provide a method of simultaneously feeding the tape of a taped program from a turntable loaded according to the invention into an associated apparatus for rendering the taped program and thence rewinding it back on the same continuous renditions of the taped program.

Another object of the invention is to provide a method of and apparatus for automating all succeeding renditions of a taped program after the first rendition in accordance with any desired schedule of time.

BRIEF DESCRIPTION OF THE SEVERAL VIEWS OF THE DRAWINGS

FIG. 3 is an enlarged fragmentary side view of the invention with several parts shown in cross-section;

FIG. 4 is an enlarged fragmentary view of a part of the invention as shown in FIG. 3; and FIG. 5 is a schematic diagram of an energizing circuit common to the invention and associated rendition apparatus.

DESCRIPTION OF INVENTION

Figure 1:
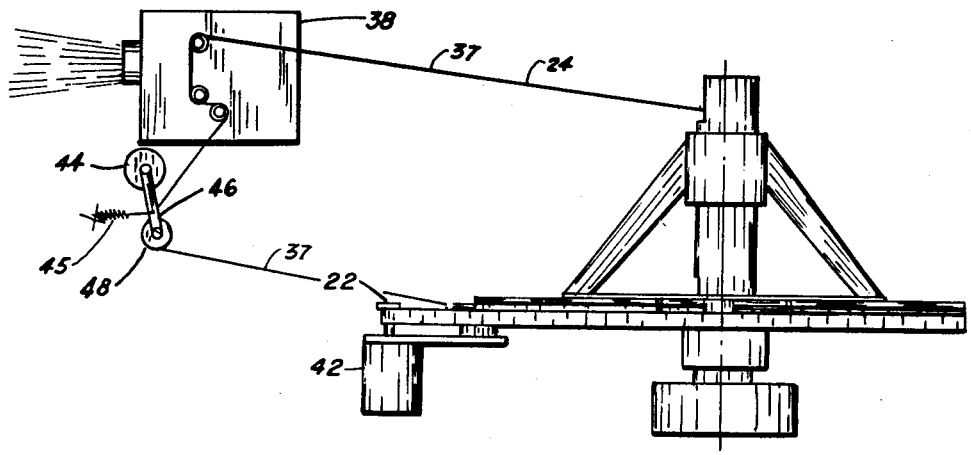
FIG. 1 is a diagrammatic side view of the invention.
Figure 2:
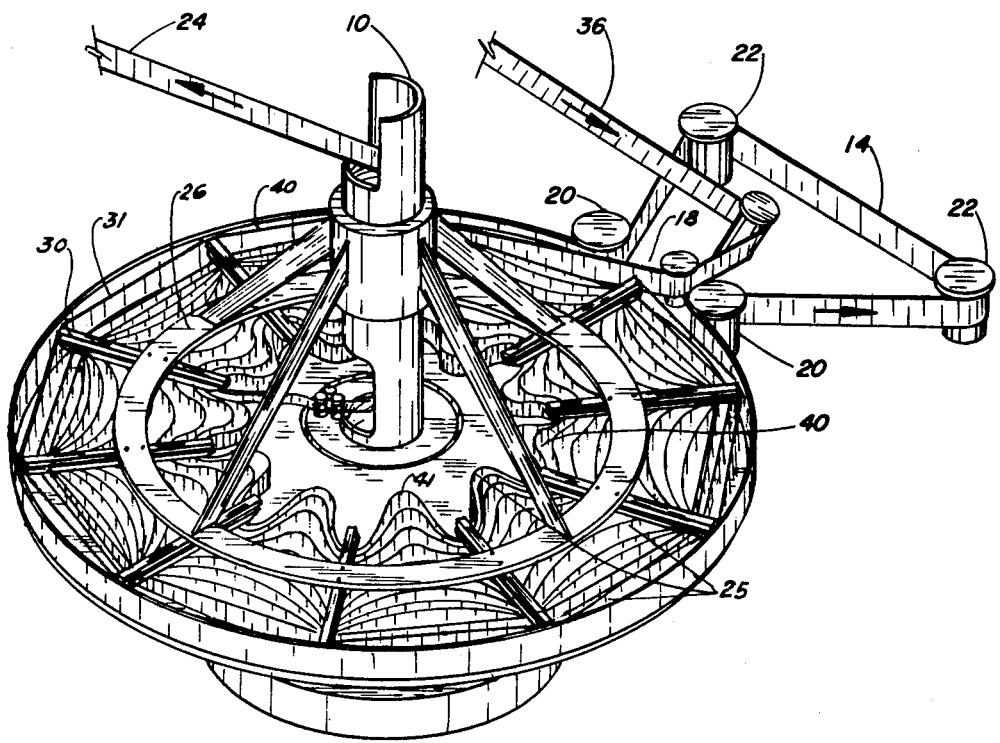
FIG. 2 is a three-dimensional view from top and side of a turntable of the invention.

Referring to the FIGS. 1-4, the invention comprises a hollow stationary shaft 10 on which is mounted for rotation a turntable 12. A wide flat belt 14 is mounted peripherally around turntable 12 and drives it in rotation. Belt 14 extends upwardly from turntable 12 to define a peripheral flange 16 around most of the circumference of turntable 12 leaving a space 18 defined between two spacing rollers 20 mounted adjacent to turntable 12 and spaced peripherally apart and on which belt 14 travels out and around drive rollers 22 to permit the feeding of tape 24 of a taped program onto turntable 12 in equal windings 25 thereon as made against flange 16. A ring 26 is suspensively supported above turntable 12 by a plurality of radial arms 28 mounted for rotation around stationary shaft 10. A larger plurality of pressure pads 30 are fixed to the side of ring 26 to frictionally engage upper edges 31 of windings 25 with a spring biased lower part 32. Windings 25 curve equally inward on turntable 12 between pressure pads 30 to follow progressively more fluted or scalloped paths (see FIG. 2). Lower part 32 of a pressure pad 30 are biased downwardly by spring 35 mounted between upperpart 33 and lower part 32.

Stationary shaft 10 defines holes 34 above and below radial arm 28 through which tape 24 is led off turntable 12 to be connected to the end 36 of tape 24 to form a closed loop, all of which, except for a bight 37, is wound in turntable 12. The bight is left free for feeding through an associated taped program apparatus 38 and back onto the turntable. The tape is directed through guides 39 for preventing slack and around rollers 43 mounted in said shaft respectively adjacent said holes 34 in said shaft.

By rotating the turntable, tape 24 is wound on table 12 under pads 30. At first, each winding 25 comprises a series of chords 40 between pressure pads 30. Each succeeding winding 25 pushes the preceding winding 25 into progressively more curved paths 41 as the equal lengths or tape per revolution of turntable between radially oriented pressure pads 30 fits between progressively less space between pads 30 as the center of table 12 is approached.

Tape 24 is simultaneously fed on and off turntable 12 and through cooperative apparatus 38 for the rendition of taped program in equal amounts of tape per revolution of turntable 12 and thus without slippage and friction between the windings 25 on table 12.

A motor 42 drives rollers 22 to rotate turntable 12 by means of belt 14 and feed the tape on table 12. Associated apparatus 38 draws tape 24 off the turntable at requisite speed. Motor 42 is controlled by a rheostat 44 operable by a swinging arm 46 pivoted thereto, and having a roller 48 engaging the free bight 37 of the tape 24 between associated apparatus 38 and turntable 12 regulating the speed of motor 42 to maintain a tension on the tape commensurate with the rate of withdrawal by associated apparatus 38.

Motor 42 and taped-program-apparatus 38 can be scheduled to turn off after every completed passage of the taped program therearound and through, or to finally cutoff after every third, or more, or less completed passages for a period of time until the next days' schedule of running the taped program. Thus, the running of the taped program after winding on turntable 12 is entirely automatic, to leave only monitoring for possible tape breakage and taped-program-apparatus failure which can be accomplished from a single station for any desired number of performances in any desired number of performance places.

For purposes of the application "tape" includes motion picture film, video tape, and magnetic tape, and a "taped program" includes any transcription thereon for rendition therefrom.

The invention in cooperation with the associated rendition apparatus 38 can be automated by adding an off-on switch 50 to a common energizing circuit 52, therefor, that is operable by a time responsive element 54, whereby a schedule of daily renditions of the taped program can be set on said time responsive element 54 for daily repetitions of said schedule for an indefinite period (see FIG. 5).

What is claimed is:

1. A tape-handling unit comprising a turntable rotatable about an axis, and means for holding loops of a tape on edge against the turntable along a plurality of radii of the turntable and permitting movement of the tape radially along each radius while restricting circumferential movement of the tape across the radius, wherein the holding means is rotatable about the axis of the turntable, and means for rotating the turntable and the holding means in synchronism.

2. A tape storage unit in accordance with claim 1, further comprising means for applying tape to the outer loop at a point remote from the axis of the turntable while progressively displacing preceding windings inwardly by succeeding windings.

3. A tape-handling apparatus comprising:
   (a) a turntable rotatable about an axis;
   (b) means for holding loops of a tape wound on the turntable on edge against the turntable along a plurality of radii of the turntable and permitting movement of the tape radially along each radius while restraining circumferential movement of the tape across the radius;
   (c) means for mounting the holding means for rotation about the axis of the turntable;
   (d) means for rotating the turntable and the holding means for synchronism; and
   (e) means for winding equal lengths of tape per revolution of the turntable remote from the axis of the turntable while progressively displacing preceding windings inwardly by succeeding windings.

4. A tape-handling apparatus comprising a turntable rotatable about an axis; means for holding a tape wound on a turntable on edge against the turntable along a plurality of radii of the turntable and permitting movement of the tape radially along each of the plurality of radii while restraining circumferential movement of the tape across each of the plurality of radii; means for applying equal lengths of tape per revolution of the turntable at a fixed point relative to the axis and remote from the axis of the turntable while progressively displacing preceding windings inwardly by succeeding windings; and means for removing from near the center of the turntable lengths of tape for each revolution of the turntable substantially equal to the length of tape applied per revolution of the turntable.

5. A tape-handling apparatus comprising a turntable rotatable about an axis; means for holding a tape wound on the turntable on edge along a plurality of radii of the turntable and permitting movement of the tape radially along each of the plurality of radii while restraining circumferential movement of the tape across each of the plurality of radii; means for applying equal lengths of tape per revolution of the turntable at a fixed point relative to the axis and remote from the axis of the turntable while progressively displacing preceding windings inwardly by succeeding windings; and means for mounting the holding means about the axis of the turntable and means for rotating the holding means in synchronism with the turntable.

6. Method of storing a continuous loop on a turntable for repetitive winding and unwinding comprising the steps of:
   (a) winding onto a turntable equal lengths of tape per revolution of turntable beginning with the starting end of said tape and progressing to the finishing end thereof, the initial and following windings being sequentially wound near the periphery of said turntable with each winding displacing radially inward the preceding windings which become increasingly curved as the equal lengths thereof are constricted by progressively decreasing distance from the axis of the turntable;
   (b) restraining the inward movement of the tape along selected radii to cause the formation of scallops in the inner windings of the tape;
   (c) drawing the starting end from adjacent the center of the turntable; and
   (d) joining the finishing and starting ends of said tape in an off turntable bight.

7. The method in accordance with claim 6 wherein the selected radii are equally spaced around the turntable.

* * * * *